United States Patent
Zahn et al.

[11] Patent Number: 5,798,821
[45] Date of Patent: Aug. 25, 1998

[54] COPYING OF FILM UNDER DIFFERENT CONDITIONS

[75] Inventors: Wolfgang Zahn, München; Werner von Stein, Hamburg, both of Germany

[73] Assignee: Agfa-Gevaert AG, Leverkusen, Germany

[21] Appl. No.: 870,125

[22] Filed: Jun. 3, 1997

[30] Foreign Application Priority Data

Jul. 23, 1996 [DE] Germany ............. 196 29 721.4

[51] Int. Cl.[6] ............................................. G03B 27/52
[52] U.S. Cl. ............................. 355/46; 355/38; 355/71
[58] Field of Search ..................... 355/32, 35, 38, 355/40, 41, 46, 50, 56, 68, 71, 74, 77

[56] References Cited

U.S. PATENT DOCUMENTS

| | | |
|---|---|---|
| 3,593,634 | 7/1971 | Guntersweller ............... 355/46 |
| 4,214,834 | 7/1980 | Findeis et al. ................ 355/46 |
| 4,239,385 | 12/1980 | Hujer . |
| 4,279,502 | 7/1981 | Thurm et al. . |
| 4,933,754 | 6/1990 | Reed et al. ................... 355/40 |
| 5,400,152 | 3/1995 | Manico et al. ................ 355/38 |
| 5,452,050 | 9/1995 | Ishikawa et al. .............. 355/46 |
| 5,467,165 | 11/1995 | Jacob et al. . |
| 5,486,895 | 1/1996 | Leidig et al. ................. 355/50 |

FOREIGN PATENT DOCUMENTS

| | | |
|---|---|---|
| 0 627 655 A1 | 7/1994 | European Pat. Off. . |
| 0 632 317 A2 | 1/1995 | European Pat. Off. . |
| 44 18 601 C2 | 9/1996 | Germany . |

Primary Examiner—A. A. Mathews
Attorney, Agent, or Firm—Darby & Darby

[57] ABSTRACT

A copier for making prints from photographic negatives has two copying stations arranged in series. A filmstrip is conveyed through the stations in succession, and each negative of the filmstrip is scanned upstream of the copying stations. The data obtained upon scanning is analyzed to calculate the amounts of copy light for the negatives and to determine whether the respective negatives are to be copied under standard conditions or nonstandard conditions. Masters requiring standard conditions are normally copied in the upstream copying station and pass through the downstream station without being copied. On the other hand, masters requiring nonstandard conditions are transported through the upstream station without being copied and are subsequently copied in the downstream station.

48 Claims, 1 Drawing Sheet

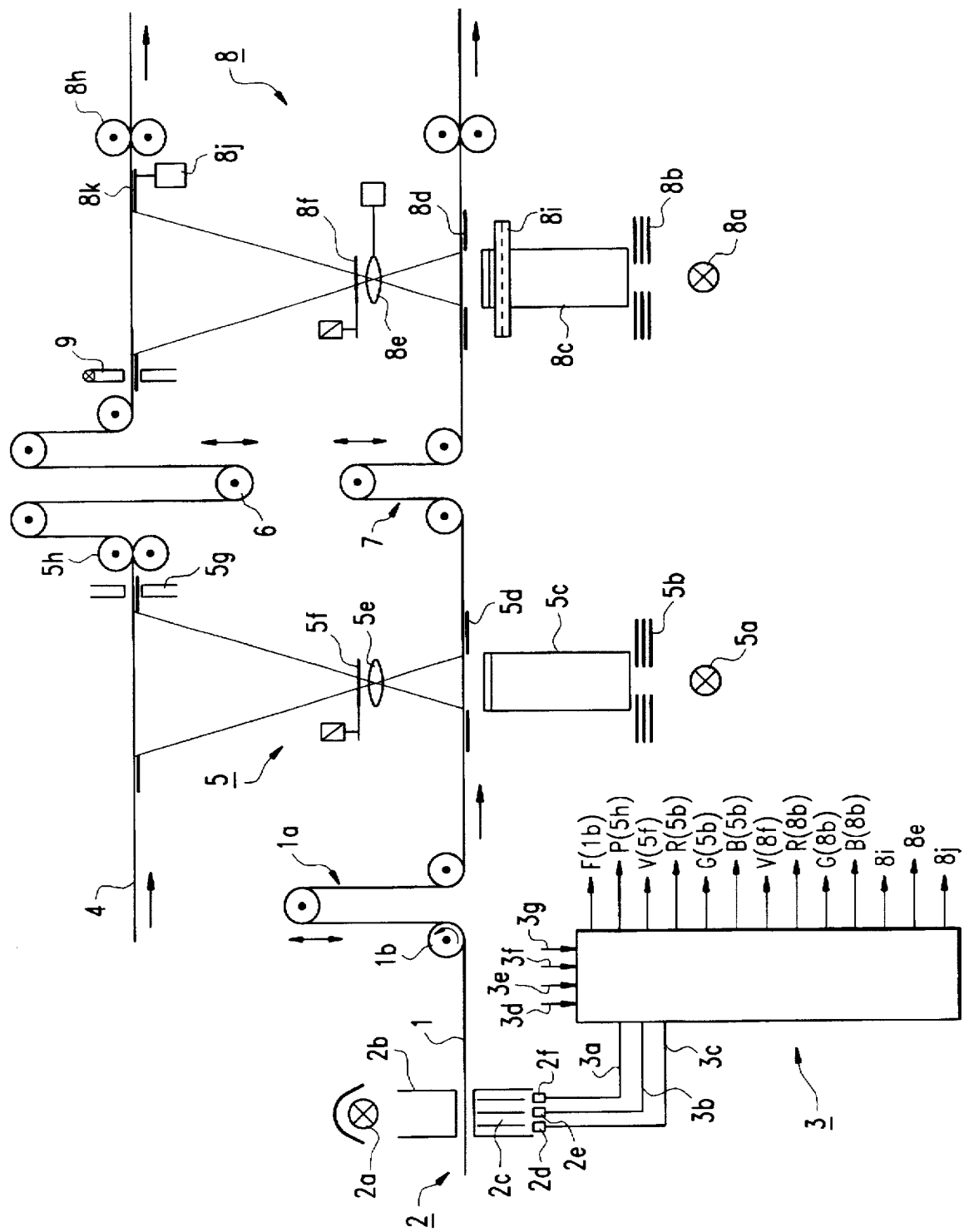

COPYING OF FILM UNDER DIFFERENT CONDITIONS

BACKGROUND OF THE INVENTION

The invention relates to the reproduction of masters, e.g. negatives.

Filmstrips containing large numbers of images are normally copied in high-capacity copiers or printers. Such copiers have an output of approximately 20,000 exposures per hour when standard copies are produced.

The camera industry is attempting to make hobby photography more interesting. To this end, there are now cameras on the market whose images can have a length-to-width ratio different from the conventional ratio. These cameras can, for example, generate so-called panoramic views. In order to take a panoramic picture, the photographer operates a switch which causes the upper and lower margins of the film to be covered. The resulting image is of normal length but reduced width.

An image of this type must be magnified during copying so that it extends across the width of the copy material. The magnification of the width of the image leads to a corresponding increase in the length thereof. The required magnification factor is approximately 2 and can be obtained by adjusting a variable objective or exchanging one objective for another.

The foregoing also applies to the so-called Advanced Photo System. This system makes it possible to select in advance between three different formats for the final prints with no detectable size differences between the masters or negatives.

The copying data for a master, including the magnification factor and the mask setting for the copy material, are provided on the master outside of the image area in the form of magnetic signals within a magnetic layer or in the form of optically readable marks. Hence, prior to copying, the master must be examined to determine the format of the copy, i.e., to determine the magnification factor and the setting for the mask. Copying can be carried out only after the appropriate adjustments have been made.

For a master with a large density range, an LCD matrix which is adjustable pointwise can be interposed between the master and the source of copy light. This allows the brightness range to be reduced so that a good copy can be obtained on normal copy material even though the master has an extreme density range.

An LCD matrix increases the exposure time and, if used for all copies, would greatly decrease the output of the copier. Similarly, the output of the copier is reduced when images, such as panoramic views, requiring a change in magnification are scattered along a filmstrip.

SUMMARY OF THE INVENTION

It is an object of the invention to provide a copying method which can prevent a significant drop in output when different masters are to be copied under different conditions.

Another object of the invention is to provide an arrangement which enables a substantial decrease in output to be avoided when different masters require different copying conditions.

The preceding objects, as well as others which will become apparent as the description proceeds, are achieved by the invention.

One aspect of the invention resides in a copying method. The method comprises conveying a pair of masters along a predetermined path extending through a pair of copying stations. A first one of the masters is copied in one of the stations and passed through the other station without being copied. The second master is copied in the latter station and passed through the former without being copied.

The method may further comprise the step of transporting two sections of copy material along another path extending through the copying stations. The first master can then be copied on a first one of the copy material sections while the second master is copied on the second copy material section.

The station in which the second master is copied can be downstream of the station in which the first master is copied. Here, the second master and second copy material section are preferably detoured between the copying stations in such a manner that the second master and the second copy material section enter the downstream station substantially simultaneously.

The first and second masters can constitute part of a strip of coherent masters. Such a strip may, for instance, be a filmstrip containing a series of color negatives. Similarly, the first and second copy material sections can form part of a strip of photographic copy material.

The method can additionally include establishing a first variation of a copying parameter for the first master and a different second variation of the parameter for the second master. The first master is then copied using the first variation while the second master is copied using the second variation.

By way of example, the copying parameter may be magnification or contrast adjustment. If the second master has large differences in contrast, the operation of copying the second master can comprise reducing the contrast range of the second master. This reduction in the contrast range may be performed using an unsharp mask, e.g., an LCD matrix.

The method can further comprise photoelectrically scanning each master at a plurality of locations to obtain density data for the respective locations. The establishing step may thereupon be performed using such data.

It can happen that the first and second masters constitute part of a set in which a majority of the masters are to be copied using the first variation of the copying parameter whereas a minority of the masters are to be copied using the second variation. Here, one or more masters of the majority are advantageously copied in the same station as the second master, especially when the minority constitutes 5 percent or less of the masters of the set. It is preferred for the masters of the majority to be divided between the copying stations in such a manner that the stations are utilized about equally during copying of the masters of the set.

It can also happen that the first and second masters form part of a set having consecutive masters which are to be copied using the second variation of the copying parameter and additional masters which are to be copied using the first variation. Under such circumstances, it is of advantage for one or more of the additional masters to be copied in the same station as the second master. Preferably, the additional masters are divided between the copying stations in such a manner that the stations are utilized about equally during copying of the masters of the set.

The method may further include providing the second copy material section with a mark upstream of the station in which the second master is copied, and sensing the mark to position the second section in such station. When the station for copying the second master is downstream of the other copying station, the mark can be made at the latter station. The mark can be a cut and is preferably a perforation.

Another aspect of the invention resides in a copying arrangement having a pair of copying stations, and means for conveying masters along a predetermined path extending through the stations.

In one embodiment of the arrangement, one of the copying stations includes a masking member for unsharp masking of masters to be copied.

Another embodiment of the arrangement comprises control means programmed to copy first masters in one of the stations and second masters in the other of the stations. The control means is also programmed to prevent copying of the first masters in the latter station and the second masters in the former station.

One of the copying stations can be designed for the rapid copying of masters under standard conditions while the other station can be designed to copy masters more slowly under special or nonstandard conditions. By scanning the masters upstream of the copying stations to obtain density values for the masters, control signals indicative of the format of an image can be generated. It then becomes possible to assign the standard or normal masters which can be copied under standard conditions to the faster station and the nonstandard or special masters which require special copying conditions to the slower station. As long as the proportion of special masters does not exceed a predetermined value, sufficient time is available for special copying operations in the slower station.

If the slower station is downstream of the faster station, copying can be enhanced by detouring or temporarily storing the special masters and the corresponding sections of copy material between the stations. This allows the copying stations to be uncoupled from one another, that is, to operate independently of each other, so that copying operations can be carried out in the two stations simultaneously.

Additional features and advantages of the invention will be forthcoming from the following detailed description of preferred embodiments when read in conjunction with the accompanying drawing.

BRIEF DESCRIPTION OF THE DRAWING

The single FIGURE schematically illustrates a copier in accordance with the invention.

DESCRIPTION OF THE PREFERRED EMBODIMENTS

Referring to the sole FIGURE, a copier or copying arrangement according to the invention is shown. The numeral 1 identifies a strip or band of coherent masters or originals, and the strip is here assumed to be a filmstrip consisting of several individual exposed and developed films spliced end-to-end. Each of the films carries a series of photographs or images which constitute the masters and can, for instance, be in the form of color negatives.

By way of example, the filmstrip 1 can be made up of conventional 135 mm films or of films suited for the new Advanced Photo System. The surface of a film for the Advanced Photo System is covered by a transparent magnetic layer, and this layer is provided with data concerning the formats of the copies to be made from the film. The data can be read by a magnetic reader which is not illustrated but can be incorporated in the copier.

The filmstrip 1 is conveyed lengthwise from left to right as indicated by arrows. A photoelectric scanner 2 is located along the path of the filmstrip 1 and includes a light source 2a, a reflecting or mixing tube 2b, and three arrays 2c of optical fibers. The reflecting tube 2b functions to mix and uniformize the light from the source 2a. The arrays 2c run perpendicular to the filmstrip 1 and the direction of travel thereof, and across the width of the filmstrip 1. Each array 2c receives light which has passed through a strip of the filmstrip 1 extending normal to the direction of movement thereof and conducts the light to a respective linear CCD 2d, 2e or 2f. The CCDs 2d, 2e, 2f are each sensitized to a respective one of the primary colors red, green and blue. This can be accomplished by placing appropriate strip-shaped color filters in front of the CCDs 2d,2e,2f. It is here assumed that the CCD 2d is sensitized to red by a red filter, the CCD 2e to green by a green filter, and the CCD 2f to blue by a blue filter. The individual color filters can be matched to the spectral sensitivity of a strip or band 4 of photographic copy material, such as copy paper, with a good degree of precision. Similarly to the filmstrip 1, the copy material 4 is transported lengthwise from left to right as indicated by arrows.

The scanner 2 is designed to scan the masters of the filmstrip 1 at a plurality of zones or locations. The scanner 2 generates density values for each of the primary colors red, green and blue, and such density values are used to calculate the amounts of copy light for the masters and to establish the copying conditions or parameters for the masters.

The three CCDs 2d, 2e, 2f are connected to a computer or evaluating unit 3 having three inputs 3a, 3b and 3c for the density values in the respective primary colors. For the strips of the filmstrip 1 scanned at a given moment, the density values in the different primary colors arrive at the computer 3 at different times due to the offset of the CCDs 2d, 2e, 2f from one another. However, these density values can be combined in the computer 3.

The filmstrip 1 is conveyed through the scanner 2 at a uniform speed by a transporting or conveying device 1b which is located downstream of the scanner 2 and is shown as a roller. The filmstrip 1 is conveyed stepwise, and the transporting device 1b delivers pulses indicative of the step length to an input 3d of the computer 3. This allows the density values to be associated with respective positions along the filmstrip 1.

Downstream of the transporting device 1b is a temporary storage or detouring device 1a which causes a loop to be formed in the filmstrip 1. As indicated by the double-headed arrow, the storage device 1a is adjustable to vary the length of the loop. The storage device 1a makes it possible to scan all of the masters of an individual film of the filmstrip 1 before the first master of the individual film enters a copying or printing station 5 downstream of the storage device 1a.

The copying station 5 contains a source 5a of copy light as well as a filter unit 5b. The filter unit 5b includes three subtractive filters which can be moved into the optical path to a greater or lesser degree in order to impart the proper color composition to the copy light. A reflecting or mixing tube 5c is disposed downstream of the filter unit 5b as considered along the optical path and serves to mix and uniformize the copy light so that the copy light has uniform intensity and color distributions. A conventional film platform or support 5d is situated downstream of the reflecting tube 5c and may, for example, be interchangeable to accommodate filmstrips of different width. The platform 5d has a central opening which is in register with a master to be copied, and an image of the master is projected onto a corresponding section of the copy material 4 by an objective 5e. This section of the copy material 4 is in register with a central opening of a conventional copy material platform or support which is illustrated but not identified.

The density data supplied by the scanner 2 is used by the computer 3 to calculate the amounts of red, green and blue copy light required for each master. When a master is positioned in the copying station 5, the computer 3 adjusts the filter unit 5b in accordance with the calculated amounts of copy light. The computer 3 further opens an electromagnetically operated shutter 5f disposed along the optical path to expose the corresponding section of the copy material 4 to the copy light. The exposure time is selected in such a manner that the exposed section of the copy material 4 is impinged by the calculated amounts of red, green and blue copy light.

A marking device 5g is situated adjacent the copy material platform and serves to form a mark at the edge of the exposed section of the copy material 4. The mark can be a cut but is preferably a perforation. The mark can be used to determine the distance moved by the copy material 4 and to facilitate cutting of the latter following development.

A transporting or conveying device 5h for the copy material 4 is located downstream of the copying station 5. The transporting device 5h, which is shown as a pair of rollers, shifts the copy material 4 after a section thereof has been exposed in the copying station 5 so that an unexposed section of the copy material 4 is brought into the station 5. The transporting device 5h drives the copy material 4 stepwise and generates a pulse for each step. The pulses are delivered to an input 3e of the computer 3.

The copying station 5 is designed to produce standard or normal copies under standard or normal copying conditions. A second copying station 8 for making nonstandard or special copies under nonstandard or special copying conditions is disposed downstream of the copying station 5.

Between the copying stations 5 and 8 is a temporary storage or detouring device 6 for the copy material 4. The storage device 6, which causes the copy material 4 to develop loops, is adjustable as indicated by the double-headed arrow to vary the lengths of the loops. A second temporary storage or detouring device 7 is provided for the filmstrip 1 intermediate the copying stations 5 and 8 and causes a loop to form therein. As shown by the double-headed arrow, the storage device 7 is adjustable to vary the length of the loop in the filmstrip 1.

The storage device 7 can accommodate an individual film of the filmstrip 1 while the storage device 6 can accommodate a length of the copy material 4 sufficient to copy all of the masters of an individual film. The storage devices 6,7 make it possible to compensate for nonuniform distributions of masters to be copied under standard and nonstandard conditions.

A sensing device 9 located downstream of the marking device 5g at the entrance to the copying station 8 functions to sense the marks made by the device 5g. The sensing device 9 produces a signal when a mark is detected, and the signal is forwarded to an input 3f of the computer 3. The computer 3 contains a unit for regulating the movement of the copy material 4, and the input 3f is connected to such regulating unit.

A second transporting or conveying device 8h for the copy material 4 is disposed downstream of the copying station 8. The transporting device 8h, which is illustrated as a pair of rollers, includes a stepper motor which delivers pulses to an input 3g of the computer 3.

The signals from the sensing device 9, together with the pulses generated by the transporting units 5h, 8h, permit a precise determination of the distance moved by the copy material 4.

The copying station 8 comprises a source 8a of copy light, a filter unit 8b, and a reflecting or mixing tube 8c. The copying station 8 further comprises a film platform or support 8d having a central opening which is in register with a master to be copied. An image of the master is projected onto a corresponding section of the copy material 4 by an objective 8e, and this section of the copy material 4 is in register with a central opening of a copy material platform or support which is illustrated but not identified. The copy material platform includes an adjustable masking unit 8k for delimiting the section of the copy material 4 which is to be exposed in the copying station 8. The masking unit 8k is connected to a drive 8j which functions to adjust the masking unit 8k.

The objective 8e is likewise adjustable to change the magnification. For instance, the objective 8e can be movable between a position in which the magnification factor is appropriate for panoramic pictures and a position in which the magnification factor is appropriate for normal pictures. The objective 8e is driven at a measured speed by a drive which is illustrated but not identified.

An electromagnetically operated shutter 8f in the copying station 8 controls the exposure time.

The copying station 8 additionally comprises a Liquid Crystal Display (LCD) matrix or masking member 8i which can function as an unsharp mask. The LCD matrix 8i is adjustable pointwise on the basis of data from the scanner 2, and adjustment of the LCD matrix 8i can be performed in accordance with the teachings of the German Patent No. 28 20 965. By way of example, the LCD matrix 8i may be adjusted so as to reduce the density range or contrast of a master to a level which is reproducible by the copy material 4.

Magnification and contrast adjustment by way of the LCD matrix 8i represent two copying conditions or parameters which may differ between the copying stations 5 and 8.

The computer 3 has a series of outputs which are connected with respective components of the copier. The outputs and their functions are as follows:

Output F(1b)—controls movement of the filmstrip 1.
Output P(5h)—controls movement of the copy material 4.
Output V(5f)—controls the shutter 5f of the standard copying station 5.
Output R(5b)—controls the cyan filter of the filter unit 5b in the standard copying station 5.
Output G(5b)—controls the magenta filter of the filter unit 5b in the standard copying station 5.
Output B(5b)—controls the yellow filter of the filter unit 5b in the standard copying station 5.
Output V(8f)—controls the shutter 8f of the nonstandard copying station 8.
Output R(8b)—controls the cyan filter of the filter unit 8b in the nonstandard copying station 8.
Output G(8b)—controls the magenta filter of the filter unit 8b in the nonstandard copying station 8.
Output B(8b)—controls the yellow filter of the filter unit 8b in the nonstandard copying station 8.
Output 8e—controls the objective 8e to change magnification in the nonstandard copying station 8.
Output 8i—controls the LCD matrix 8i to adjust contrast in the nonstandard copying station 8.
Output 8j—controls the mask 8j for the copy material 4 in the nonstandard copying station 8.

The copier may be a roll copier. In a copier of this type, the filmstrip 1 is unwound from a supply reel upstream of the scanner 2 and rewound onto a take-up reel downstream of the copying station 8. Similarly, the copy material 4 is unwound from a supply reel upstream of the copying station 5 and rewound onto a take-up reel downstream of the copying station 8.

The copier is designed to permit high copying speeds even though certain masters of a series require special handling. The operation of the copier when some masters of the filmstrip 1 are to be copied under nonstandard conditions is as follows:

Before an individual film of the filmstrip 1 enters the standard copying station 5, all of the masters of the film are scanned in the scanner 2. Furthermore, the computer 3 calculates the amounts of copy light for the masters of the film and establishes the formats of the copies to be made from the masters. The amount of copy light for a master of the film in each of the primary colors red, green and blue can be calculated from the density data for the entire film as taught, for example, in the German Patent No. 28 40 287.

If a master of the individual film is nonstandard because its density range is too great for the copy material 4 or a copy to be made from the master is to have a nonstandard format, the master is not copied in the standard copying station 5. Likewise, the corresponding section of the copy material 4 is not exposed in the copying station 5, and such section is provided with a mark and transported away from the station 5. The amounts of copy light for the nonstandard master are stored until this master enters the nonstandard copying station 8.

The filmstrip 1 and the copy material 4 continue to advance, and the masters which follow the nonstandard master and are to be copied under standard conditions are copied in the standard copying station 5. As the unexposed section of the copy material 4 corresponding to the nonstandard master moves through the storage device 6, the distance traveled thereby is monitored by the pulses from the transporting devices 5h,8h. When the unexposed section reaches the nonstandard copying station 8, the sensing device 9 detects the mark on the unexposed section and generates a signal. This signal, together with the pulses from the transporting devices 5h, 8h, is used to position the unexposed section in the copying station 8 with a high degree of precision. The sensing device 9 makes it possible to correct for slippage of the copy material 4 in the transporting devices 5h, 8h.

The distance traveled by the nonstandard master as it moves from the standard copying station 5 to the nonstandard copying station 8 is monitored via the pulses from the transporting device 1b. These pulses also precisely control the positioning of the nonstandard master in the copying station 8. The nonstandard master and the corresponding unexposed section of the copy material 4 enter the copying station 8 simultaneously or approximately simultaneously.

If the density range of the nonstandard master is too great for the copy material 4, the LCD matrix 8i is adjusted appropriately once the nonstandard master has entered the copying station 8. Similarly, if a nonstandard copy is to be made from the master, the objective 8e is adjusted to set the selected magnification. When the LCD matrix 8i and/or the objective 8e have been adjusted, the computer 3 operates the filter unit 8b and the shutter 8f to copy the nonstandard master using the correct amounts of copy light for the conditions established in the copying station 8. In this manner, a high-quality copy is obtained under special copying conditions.

The masters copied in the standard copying station 5 are conveyed through the copying station 8 without being copied. The corresponding sections of the copy material 4, which were exposed in the station 5, are passed through the station 8 without further exposure.

So long as the proportion of nonstandard masters does not exceed 10 to 20 percent, the output of the standard copying station 5 is not affected. Overall, the output of the copier then exceeds that obtainable with filmstrips which are to produce copies of standard format or are to be copied using standard exposures exclusively.

As an additional advantage, the copies of a film are available as a block, and in the same sequence as the masters, when the copy material 4 is cut following development.

With little or no additional expense, the nonstandard copying station 8 can be constructed so as to be capable of making standard copies as well as nonstandard copies. If nonstandard copies to be produced in the copying station 8 differ from standard copies only in length and magnification, the station 8 may be easily converted from nonstandard copies to standard copies by adjusting the mask 8k and the objective 8e. Furthermore, the LCD matrix 8i can be adjusted to permit uniform illumination of a master.

The percentage of the masters of a film which are to be copied under special conditions can be readily determined from the computer 3. If this percentage is very low, e.g., less than 5 percent, or even if the percentage is higher and the nonstandard masters lie directly behind one another and differ from a standard master in the same manner, the utilization of the nonstandard copying station 8 may be lower than that of the standard copying station 5. By designing the copying station 8 for standard copies as well as nonstandard copies, such discrepancy can be at least largely eliminated and the output of the copier increased to the point where both copying stations 5,8 are fully utilized. This can be accomplished by calculating in advance the time required to copy each master of a film as well as the time required to convert the copying station 8 from nonstandard to standard copies and vice versa. Once these times are known, the standard masters can be divided between the copying stations 5, 8 in such a manner that the two stations 5,8 are utilized equally or approximately so. Some of the standard masters are then passed through the standard copying station 5 without being copied and are subsequently copied in the copying station 8.

Various additional modifications are possible within the meaning and range of equivalence of the appended claims.

We claim:

1. A copying method, comprising the steps of conveying a pair of masters along a path extending through a pair of copying stations, one of said stations including a first source of radiant energy directed at said path, and the other of said stations including a second source of radiant energy directed at said path; assigning one of said masters to said one station for copying and the other of said masters to said other station for copying based on a difference in at least one characteristic of said masters; copying said one master in said one station using said first source, said one master being passed through said other station without being copied; and copying said other master in said other station using said second source, said other master being passed through said one station without being copied.

2. The method of claim 1, further comprising the step of establishing a first variation of a copying parameter for said one master and a different second variation of said parameter for said other master, said one master being copied using said first variation and said other master being copied using said second variation.

3. The method of claim 2, further comprising the step of photoelectrically scanning each of said masters at a plurality of locations to obtain density data for the respective locations, the establishing step being performed using said data.

4. The method of claim 2, wherein said parameter is magnification or contrast.

5. The method of claim 2, wherein said one master and said other master constitute part of a set in which a majority of the masters are to be copied using said first variation, at least one master of said majority being copied in said other station.

6. The method of claim 5, wherein said majority constitutes 95 percent or more of the masters of said set.

7. The method of claim 5, wherein the masters of said majority are divided between said stations in such a manner that said stations are utilized about equally during copying of the masters of said set.

8. The method of claim 2, wherein said one master and said other master constitute part of a set having consecutive masters which are to be copied using said second variation and additional masters which are to be copied using said first variation, at least one of said additional masters being copied in said other station.

9. The method of claim 8, wherein said additional masters are divided between said stations in such a manner that said stations are utilized about equally during copying of the masters of said set.

10. The method of claim 1, further comprising the step of transporting two sections of copy material along another path extending through said stations, said one master being copied on one of said sections and said other master being copied on the other of said sections.

11. The method of claim 10, wherein said other station is downstream of said one station, said other master and said other section being detoured between said stations in such a manner that said other master and said other section enter said other station simultaneously or approximately simultaneously.

12. The method of claim 10, wherein said masters constitute part of a strip of coherent masters and said sections constitute part of a strip of copy material.

13. The method of claim 10, wherein said masters and said sections comprise photographic material.

14. The method of claim 13, wherein said masters comprise color negatives.

15. The method of claim 10, further comprising the steps of providing said other section with a mark upstream of said other station, and sensing said mark to position said other section in said other station for copying.

16. The method of claim 15, wherein said other station is downstream of said one station and the providing step is performed at said one station.

17. The method of claim 15, wherein said mark comprises a cut.

18. The method of claim 15, wherein said mark comprises a perforation.

19. The method of claim 1, wherein the step of copying said other master comprises reducing the contrast of said other master.

20. The method of claim 19, wherein said reducing is performed using an unsharp mask located in said other station, said one station being devoid of a mask for unsharp masking.

21. The method of claim 20, wherein said unsharp mask comprises an LCD matrix.

22. The method of claim 1, wherein the copying steps are performed substantially independently of one another.

23. The method of claim 1, wherein said one characteristic is density range or format.

24. A copying arrangement, comprising a pair of copying stations; means for conveying masters along a path extending through said stations, one of said stations including a first source of radiant energy directed at said path, and the other of said stations including a second source of radiant energy directed at said path; and control means programmed to assign a first master to said one station for copying and a second master to said other station for copying based on a difference in at least one characteristic of the first and second masters, said control means being further programmed to copy the first master in said one station using said first source and the second master in said other station using said second source, and said control means also being programmed to prevent copying of the first master in said other station and the second master in said one station.

25. The arrangement of claim 24, wherein said control means is programmed to establish copying conditions for the masters.

26. The arrangement of claim 25, further comprising scanner means upstream of said stations for scanning the masters, and means for transmitting data from said scanner means to said control means.

27. The arrangement of claim 24, wherein said copying stations are operable substantially independently of one another.

28. The arrangement of claim 24, further comprising means for transporting copy material along another path extending through said stations, means for detouring the copy material between said stations, and means for detouring masters between said stations.

29. The arrangement of claim 24, wherein said control means is programmed to assign the first master to said one station and the second master to said other station based on a difference in density range or format of the first and second masters.

30. A copying arrangement, comprising a pair of copying stations; and means for conveying masters along a path extending through said stations, one of said stations including a first source of radiant energy directed at said path, and the other of said stations including a second source of radiant energy directed at said path, said one station further including a masking member for unsharp masking of masters to be copied, and said other station being devoid of a masking member for unsharp masking of masters to be copied.

31. The arrangement of claim 30, wherein said masking member is adjustable to vary the masking effect thereof.

32. The arrangement of claim 30, wherein said masking member comprises an LCD matrix.

33. The arrangement of claim 30, wherein said one station is designed to make copies using a first variation of a copying parameter and said other station is designed to produce copies using a different second variation of the copying parameter.

34. The arrangement of claim 33, wherein said other station is designed to produce standard copies and said one station is designed to make nonstandard copies.

35. The arrangement of claim 30, further comprising scanner means upstream of said stations for scanning each master at a plurality of locations.

36. The arrangement of claim 35, further comprising control means, and means for transmitting data from said scanner means to said control means, said control means being programmed to assign a first master to said one station for copying and a second master to said other station for copying based on a difference in at least one characteristic of the first and second masters.

37. The arrangement of claim 36, further comprising means for transporting copy material along another path extending through said stations, said control means being programmed to assign a section of copy material to each master.

38. The arrangement of claim 36, wherein said masking member is adjustable to vary the masking effect thereof and said control means is programmed to determine an adjustment for said masking member for each master to be copied in said one station.

39. The arrangement of claim 36, wherein said masking member is adjustable to vary the masking effect thereof and said control means is programmed to adjust said masking member.

40. The arrangement of claim 36, wherein said one station is provided with means for changing magnification and said control means is programmed to adjust said changing means.

41. The arrangement of claim 36, wherein said one station is designed to make copies using a first variation, as well as a different second variation, of a copying parameter and said other station is designed to produce copies using the second variation, said control means being programmed so that, when a majority of the masters of a set are to be copied using the second variation, said control means divides the masters of the majority between said stations for copying.

42. The arrangement of claim 41, wherein said control means is programmed to divide the masters of the majority between said stations when 95 percent or more of the masters of the set are to be copied using the second variation.

43. The arrangement of claim 41, wherein said control means is programmed to divide the masters of the majority between said stations in such a manner that said stations are utilized about equally during copying of the masters of the set.

44. The arrangement of claim 36, wherein said one station is designed to make copies using a first variation, as well as a different second variation, of a copying parameter and the other of said stations is designed to produce copies using the second variation, said control means being programmed so that, when consecutive masters of a set are to be copied using the first variation while additional masters of the set are to be copied using the second variation, said control means divides the additional masters between said stations for copying.

45. The arrangement of claim 44, wherein said control means is programmed to divide the additional masters between said stations in such a manner that said stations are utilized about equally during copying of the masters of the set.

46. The arrangement of claim 30, wherein said copying stations are operable substantially independently of one another.

47. The arrangement of claim 30, further comprising means for transporting copy material along another path extending through said stations, means for detouring the copy material between said stations, and means for detouring masters between said stations.

48. The arrangement of claim 36, wherein said control means is programmed to assign the first master to said one station and the second master to said other station based on a difference in density range or format of the first and second masters.

* * * * *

UNITED STATES PATENT AND TRADEMARK OFFICE
CERTIFICATE OF CORRECTION

PATENT NO. : 5,798,821
DATED : August 25, 1998
INVENTOR(S) : Wolfgang Zahn et al.

It is certified that error appears in the above-identified patent and that said Letters Patent is hereby corrected as shown below:

Title page,
Item [22], please correct the filing date "June 3, 1997" to -- June 4, 1997 --.

Signed and Sealed this

Ninth Day of October, 2001

*Attest:*

NICHOLAS P. GODICI
*Attesting Officer*     *Acting Director of the United States Patent and Trademark Office*